(12) United States Patent
Liu et al.

(10) Patent No.: US 10,371,038 B2
(45) Date of Patent: Aug. 6, 2019

(54) CONNECTION PIECE ASSEMBLY UNIT, ESPECIALLY FOR AN EXHAUST GAS TREATMENT DEVICE OF AN EXHAUST SYSTEM OF AN INTERNAL COMBUSTION ENGINE

(71) Applicant: Eberspächer Exhaust Technology GmbH & Co. KG, Neunkirchen (DE)

(72) Inventors: Dan Liu, Esslingen (DE); Peter Kast, Esslingen (DE)

(73) Assignee: EBERSPÄCHER EXHAUST TECHNOLOGY GMBH & CO. KG, Neunkirchen (DE)

(*) Notice: Subject to any disclaimer, the term of this patent is extended or adjusted under 35 U.S.C. 154(b) by 71 days.

(21) Appl. No.: 15/651,386

(22) Filed: Jul. 17, 2017

(65) Prior Publication Data
US 2018/0023451 A1  Jan. 25, 2018

(30) Foreign Application Priority Data

Jul. 19, 2016 (DE) ................ 10 2016 113 231

(51) Int. Cl.
| F01N 3/10 | (2006.01) |
|---|---|
| F01N 13/00 | (2010.01) |
| F01N 13/08 | (2010.01) |
| F01N 13/10 | (2010.01) |
| F01N 13/14 | (2010.01) |
| F01N 13/18 | (2010.01) |
| F01N 3/021 | (2006.01) |
| F16L 41/00 | (2006.01) |

(52) U.S. Cl.
CPC ....... *F01N 13/1805* (2013.01); *F01N 13/008* (2013.01); *F01N 13/08* (2013.01); *F01N 13/102* (2013.01); *F01N 13/14* (2013.01); *F01N 13/141* (2013.01); *F01N 13/148* (2013.01); *F16L 41/008* (2013.01); *F01N 3/021* (2013.01); *F01N 3/10* (2013.01); *F01N 2260/20* (2013.01); *F01N 2310/00* (2013.01); *F01N 2450/22* (2013.01); *F01N 2450/24* (2013.01); *F01N 2510/02* (2013.01); *F01N 2530/26* (2013.01); *F01N 2560/00* (2013.01)

(58) Field of Classification Search
USPC .................... 60/274, 276, 277, 285, 286
See application file for complete search history.

(56) References Cited

U.S. PATENT DOCUMENTS 5,143,410 A    9/1992  Takikawa
5,832,723 A *  11/1998 Iwata .................. F01N 13/008
                                                60/276
(Continued)

FOREIGN PATENT DOCUMENTS

DE    37 22 369 A1    8/1988
DE    103 46 205 A1   9/2004
(Continued)

*Primary Examiner* — Binh Q Tran
(74) *Attorney, Agent, or Firm* — McGlew and Tuttle, P.C.

(57) ABSTRACT

A connection piece assembly unit, especially for an exhaust gas treatment device of an exhaust system of an internal combustion engine, includes a connection piece (30) with a base area (32) for fixing the connection piece (30) to a carrier assembly unit. A covering element (40) projects over an outside (42) of the connection piece (30).

23 Claims, 3 Drawing Sheets

(56) References Cited

U.S. PATENT DOCUMENTS

| | | | | |
|---|---|---|---|---|
| 6,319,376 | B1 * | 11/2001 | Graser | G01N 27/407 204/424 |
| 6,996,976 | B2 * | 2/2006 | Rumminger | F01N 13/008 204/421 |
| 8,061,183 | B2 * | 11/2011 | Ebner | G01N 27/4077 73/23.31 |
| 9,382,832 | B2 * | 7/2016 | Bowers | F01N 13/008 |
| 2011/0174617 | A1 * | 7/2011 | Tsuzuki | G01N 27/407 204/431 |
| 2015/0276659 | A1 * | 10/2015 | Sekiya | G01N 27/417 204/416 |

FOREIGN PATENT DOCUMENTS

| | | |
|---|---|---|
| DE | 10 2005 061145 A1 | 6/2007 |
| EP | 0 722 040 A2 | 7/1996 |
| EP | 1 012 591 A1 | 6/2000 |
| EP | 1 012 591 B1 | 2/2004 |
| EP | 1 911 945 A1 | 4/2008 |
| WO | 2004/109 270 A1 | 12/2004 |

* cited by examiner

CONNECTION PIECE ASSEMBLY UNIT, ESPECIALLY FOR AN EXHAUST GAS TREATMENT DEVICE OF AN EXHAUST SYSTEM OF AN INTERNAL COMBUSTION ENGINE

CROSS REFERENCE TO RELATED APPLICATIONS

This application claims the benefit of priority under 35 U.S.C. § 119 of German Application 10 2016 113 231.4, filed Jul. 19, 2016, the entire contents of which are incorporated herein by reference.

FIELD OF THE INVENTION

The present invention pertains to a connection piece assembly unit, especially for an exhaust gas treatment device of an exhaust system of an internal combustion engine, comprising a connection piece with a base area for fixing the connection piece to a carrier assembly unit.

BACKGROUND OF THE INVENTION

A variety of assembly units, e.g., catalytic converters and particle filters, are used for exhaust gas treatment in exhaust systems of internal combustion engines used, for example, in motor vehicles. In order to protect such assembly units against environmental effects or to insulate them thermally, covering a housing of same, which is generally composed of sheet metal material, with a covering device on its outside is known. Such a covering device may comprise, for example, a fibrous insulating material, which is in contact with the outside of the housing, on the one hand, and is enclosed on its outwardly exposed surface by an additional sheet metal housing providing a layer of protective material, on the other hand.

To be able to collect information about the states present in such exhaust gas treatment devices, for example, to be able to detect the temperature in the interior of such an exhaust gas treatment device or to be able to provide information about the exhaust gas composition, it is known to provide at a housing of such a device one or more connection pieces, via which there is access to the interior of the housing and on each of which a measuring probe, e.g., a temperature sensor or an exhaust gas sensor, can be mounted. In the area, in which such a connection piece is fixed or is to be fixed to the housing of an exhaust gas treatment device, the covering device overlapping the housing must have an opening suitable for the passage of the connection piece through the covering device. In the area of such an opening there is generally a gap-like intermediate space between the connection piece and an edge area of the covering device, so that the housing of the exhaust gas treatment device is not overlapped outwardly by the covering device in this area.

SUMMARY OF THE INVENTION

An object of the present invention is to provide a connection piece assembly unit, especially for an exhaust gas treatment device of an exhaust system of an internal combustion engine, and an exhaust gas treatment device equipped with at least one such connection piece assembly unit, in which the possibility of overlapping an area, enclosing a connection piece, of a carrier assembly unit carrying the connection piece, is provided in a simple manner.

According to the present invention, this object is accomplished by a connection piece assembly unit, especially for an exhaust gas treatment device of an exhaust system of an internal combustion engine, namely an exhaust gas treatment device a connection piece assembly unit comprising a connection piece with a base area for fixing the connection piece to a carrier assembly unit as well as a covering element protruding over (projecting outwardly of) an outside of the connection piece.

The connection piece assembly unit constructed according to the present invention with its covering element itself provides the technical feature that ensures that an area, enclosing the connection piece, of the carrier assembly unit carrying the connection piece is overlapped outwardly. There is thus no risk that particles from the outside will reach this area of the carrier assembly unit enclosing the connection piece. In particular, if such a carrier assembly unit is, for example, a catalytic converter of an exhaust system, the housing of which has a comparatively high temperature during operation, the risk that easily inflammable materials, for example, fuel splashes, impact the housing and may ignite, is eliminated. At the same time, due to the covering of the area of the carrier assembly unit enclosing the connection piece, this carrier assembly unit is shielded against heat loss in this area.

For fixing the covering element to the connection piece, it is proposed that the covering element have a fastening area.

To be able to shield the area of the carrier assembly unit enclosing the connection piece optionally in interaction with a covering device reliably overlapping this carrier assembly unit outwardly, it is further proposed that the covering element have an overlapping area extending starting from the fastening area in the direction away from the connection piece or/and a shielding area extending in the direction towards the base area.

To improve the shielding functionality of the covering element, provisions may be made here for the shielding area to extend at a distance from the fastening area starting from the overlapping area.

A stable fastening of the covering element to the connection piece can be guaranteed, for example, by the fastening area having a sleeve-like/sleeve shaped/sleeve configuration and overlapping the connection piece on its outside. In particular, provisions may be made here for the fastening area to be configured with an internal thread formation for fasteningly meshing with an external thread formation provided on the outside of the connection piece. The covering element may thus be fixed to this connection piece simply by screwing onto the connection piece and be brought into its position best suited for the shielding in a direction along the connection piece.

In an alternative type of embodiment, it is proposed that the fastening area have a ring washer-like/ring washer-shaped/ring washer configuration for the stable fixing of the covering element to the connection piece. In this embodiment, the fastening area may be held, i.e., for example, clamped between the connection piece and an assembly unit carried on it and thus provide not only a functionality for fastening the covering element, but also fulfill the functionality of a sealing washer to be provided between the connection piece and the assembly unit to be carried on it.

As an alternative or in addition to the features described above for fixing the covering element to the connection piece, provisions may be made for the covering element to be fixed to the connection piece by means of a connection in substance, preferably by welding, soldering or bonding.

It is proposed that the connection piece have a connection piece opening configured with an internal thread formation for receiving the assembly unit to be carried on the connection piece, preferably a measuring probe, for fixing an assembly unit to be carried on the connection piece to this connection piece.

In order to be able to establish this thread meshing in a simple manner or also to release it when the covering element is fastened to the connection piece via thread formations to be meshed with one another, it is proposed that a tool meshing formation, preferably an external polygon, be provided at the covering element.

The present invention further pertains to an exhaust gas treatment device for an exhaust system of an internal combustion engine, especially a catalytic converter device, comprising a device housing, a covering device essentially fully overlapping the device housing on its outside in at least some areas, preferably at least at an outer circumferential area, as well as at least one connection piece assembly unit having the configuration according to the present invention, the connection piece of at least one, preferably of each, connection piece assembly unit being fixed to the device housing in a mounting area of the device housing, which mounting area is not overlapped by the covering device and the covering element of this connection piece assembly unit overlaps the covering device in at least some areas in its edge area adjacent to the mounting area.

In order to be able to thermally insulate the exhaust gas treatment device or to protect it against environmental effects, it is proposed that the covering device comprise at least one layer of covering material overlapping the device housing on its outside in at least some areas and at least one layer of protective material overlapping the at least one layer of covering material in at least some areas on its side facing away from the outside of the device housing. In this case, to provide a more optimized shielding interaction with the covering element of at least one connection piece assembly unit, provisions may be made for at least one layer of protective material in the edge area of the covering device, which edge area is adjacent to the mounting area, to extend with an edge section beyond at least one layer of covering material towards the connection piece and in the direction away from the outside of the device housing.

According to an especially advantageous aspect of the configuration of the present invention, in at least one, preferably in each connection piece assembly unit in interaction with the edge section of at least one layer of protective material, the covering element may overlap the edge section in the direction away from the connection piece or/and may overlap same in the direction towards the outside of the device housing on its side facing away from the connection piece. In this way, the covering element may provide a labyrinth seal against the entry of materials into the mounting area in interaction with the edge section.

In order to avoid the generation of noises, it is proposed that the covering element not be in contact with the covering device in at least one, preferably each connection piece assembly unit.

In one embodiment that is especially simple to embody with regard to the configuration, provisions may be made for the fastening area of the covering element to be held between the connection piece and an assembly unit carried on the connection piece in at least one, and preferably in each connection piece assembly unit.

In order to guarantee an especially heat-resistant and exhaust-gas-tight hold on the device housing, it is proposed for the connection piece with its base area to be fixed to the device housing by means of a connection in substance, preferably by means of welding or soldering, in at least one, and preferably in each connection piece assembly unit.

In order to be able to maintain the operating temperature needed for a catalytic converter operation, for example, it is proposed that at least one, preferably each layer of covering material be composed of fiber material, preferably ceramic fiber material.

A reliable protection of the layer(s) of covering material outwardly can be guaranteed, for example, by at least one, preferably each layer of protective material being composed of sheet metal material.

To be able to guarantee the passage of a connection piece through the covering device in a respective mounting area, but otherwise to be able to achieve an as large-area as possible overlapping of the device housing, it is proposed that the covering device have a hole-like/hole opening in at least one, and preferably in each mounting area.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
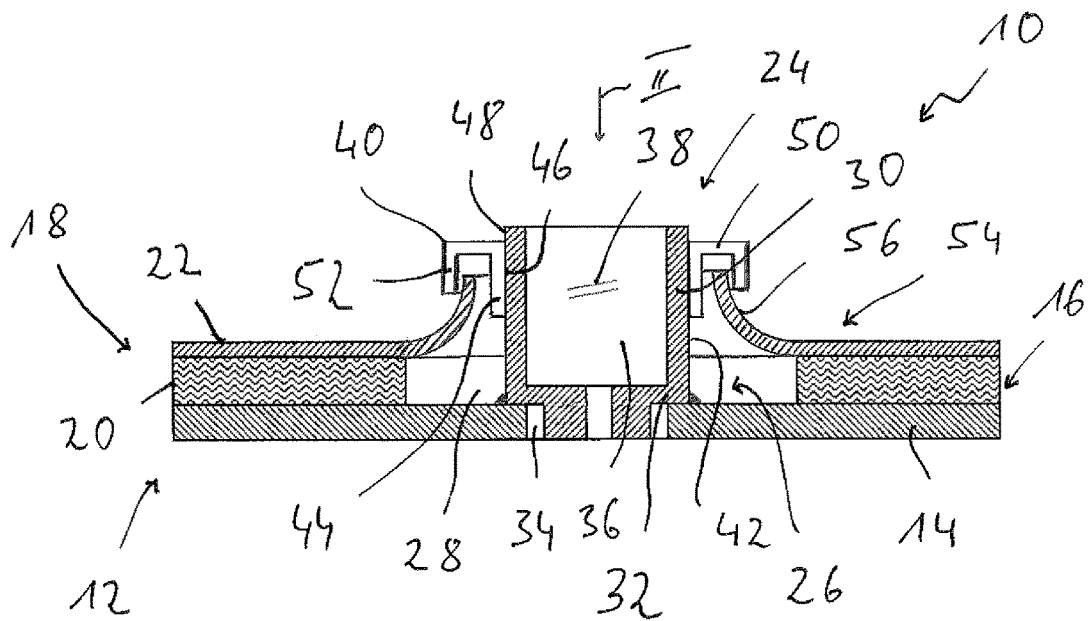
FIG. 1 is a partial sectional view of an exhaust gas treatment device with a connection piece assembly unit provided on the exhaust gas treatment device.

Referring to the drawings, a sectional view of a partial area of an exhaust gas treatment device, which is generally designated by 10, is shown in FIG. 1. The exhaust gas treatment device 10 comprises a device housing 12, a partial area of a circumferential wall 14 of which is shown in FIG. 1. If the exhaust gas treatment device 10 is a catalytic converter, for example, the catalyst material interacting with the exhaust gas flowing through the device housing 12 is carried in the interior of the exhaust gas treatment device 10 enclosed by the circumferential wall 14 and the housing device 12.

A covering device, which is generally designated by 18, is provided on an outside 16 of the device housing 12 and of the circumferential wall 14 of same. In the example being shown, this covering device comprises a layer of covering material 20, which is composed, for example, of fiber material, e.g., ceramic fiber material. The layer of covering material 20 is enclosed by a layer of protective material 22 on its side facing away from the outside 16. This layer of protective material is preferably composed of sheet metal material and protects the layer of covering material against external effects or keeps these effects stable on the outside 16 of the device housing 12.

In order to obtain a full encapsulation of the device housing 12 and correspondingly also a full thermal insulation of same, the covering device 18 essentially overlaps the entire outside 16 of the device housing 12, but at least the outside of the circumferential wall 14 of the device housing 12.

In order to obtain information, for example, about the temperature or the composition of the exhaust gas in the interior of the device housing 12, a connection piece assembly unit, which is generally designated by 24, on which a measuring probe, for example, a temperature sensor or an exhaust gas sensor, can be mounted, is provided on the device housing 12 providing a carrier assembly unit. In the area, in which the connection piece assembly unit 24 is to be fixed to the device housing 12, especially to the circumferential wall 14 of same, which is generally designated here as mounting area 26, the covering device 18 has a hole-like/hole opening 28, through which the connection piece assembly unit 24 or a connection piece 30 of same passes. The connection piece 30, with a base area 32, is fixed to the device housing 12, for example, by means of welding. In the mounting area 26, the device housing 12 has an opening 34, into which the connection piece 30 can extend or via which the connection piece 30 is open to the interior of the exhaust gas treatment device 10 enclosed by the device housing 12. The connection piece 30 has a connection piece opening 36, which may be configured, for example, with an internal thread formation in order to be able to permanently anchor a measuring probe on the connection piece.

The connection piece assembly unit 24 comprises a covering element, which is generally designated by 40, to outwardly shield the mounting area 26, in which the device housing 12 is not overlapped at least by the layer of covering material 20. In the exemplary embodiment being shown in FIG. 1, the covering element 40 comprises a fastening area 44 overlapping an outside 42 of the connection piece 30 in a sleeve-like manner, at which fastening area an internal thread formation 46 is provided for thread meshing with an external thread formation 48 provided on the outside 42 of the connection piece 30, so that the covering element 40 with its fastening area 44 can be screwed onto the connection piece 30.

An overlapping area 50 extending, for example, essentially at right angles in a direction away from the connection piece, is connected to the sleeve-like/sleeve-shaped/sleeve fastening area 44. A shielding area 52 extending, for example, essentially parallel to the sleeve area 44 in the direction towards the base area 32 of the connection piece 30 is connected to the end area of the overlapping area 50, which end area is at a distance from the fastening area 44. A cross section having an essentially L-like/L-shaped/L or U-like/U-shaped/U configuration is thus obtained for the covering element 40, which has, in principle, a ring-shaped configuration.

In an edge area 54 of the covering device 18, which edge area is adjacent to the mounting area 26, the layer of protective material 22 extends with an edge section 56 beyond the layer of covering material 20 towards the connection piece 30. In this edge section 56, the layer of protective material 22 is curved in the direction away from the outside 16 of the device housing 12, so that the edge section 56 extends, on the one hand, beyond the layer of covering material 20 towards the connection piece 30, but at the same time also away from the outside 16 of the device housing 12. As is shown in FIG. 1, this may take place, for example, by bending the edge section 56. Instead of the curvature shown in FIG. 1 with an essentially uniform radius of curvature, an angular course of the edge section 56 may also be provided.

The edge section 56 extends up to into the inner area of the covering element 40 which is enclosed by the overlapping area 50 and by the shielding area 52. This covering element, with its overlapping area 50, thus overlaps the edge section 56 in a direction away from the connection piece 30 and with its shielding area 52 overlaps the edge section 56 on its side facing away from the outside 42 of the connection piece 30. Thus, the covering element 40 forms, together with the edge section 56, a closing in the manner of a labyrinth seal, as a result of which the entry of contaminants or, for example, fuel splashes into the mounting area 26 not overlapped by the layer of covering material 20 is prevented.

Figure 2:
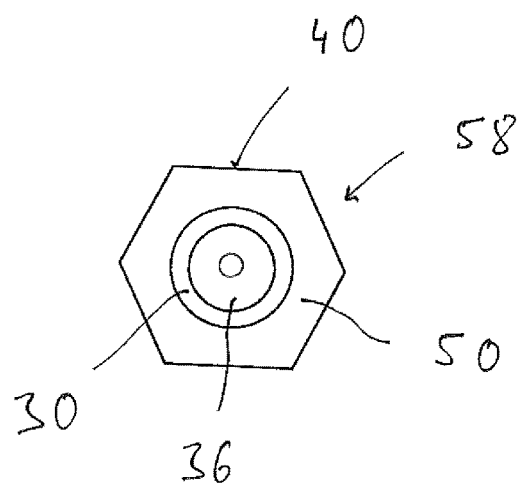
FIG. 2 is a top view of the connection piece assembly unit of FIG. 1 in the direction of view II in FIG. 1.

When mounting the exhaust gas treatment device 10 shown in FIG. 1, after the device housing 12 was assembled with the components to be received therein and the connection piece 30 was also already fixed to the device housing 12, the covering device 18 can be arranged overlapping the device housing 12, so that the edge section 56 of the layer of protective material 22 encloses the connection piece 30. Subsequently, the covering element 40 is screwed onto the connection piece 30. For this, this covering element 40 can be configured with a tool meshing formation 58, which is configured, for example, as an external polygon, and which can be seen in FIG. 2, i.e., may have an essentially hexagonal circumferential shape or one corresponding to the geometry of the external polygon, on its outside facing away from the connection piece 30. The covering element 40 may be screwed on until the edge section 56 is sufficiently overlapped by the shielding area 52. It should be noted here that a mutual contact between the covering element 40 and the edge section 56, which may lead to noises caused by vibrations, is avoided. In this position, the covering element 40 may then be anchored to the connection piece 30, for example, by means of welding, soldering or bonding, in addition to the thread meshing. Instead of the above-described thread meshing between the covering element 40 and the connection piece 30, the covering element 40 could, in principle, be pushed onto the connection piece 30 without thread meshing with its fastening area 44, which has a sleeve-like/sleeve-shaped/sleeve configuration, and be brought into the desired position and then fixed to the connection piece 30 by means of a connection in substance, i.e., by welding, soldering or bonding.

Figure 3:
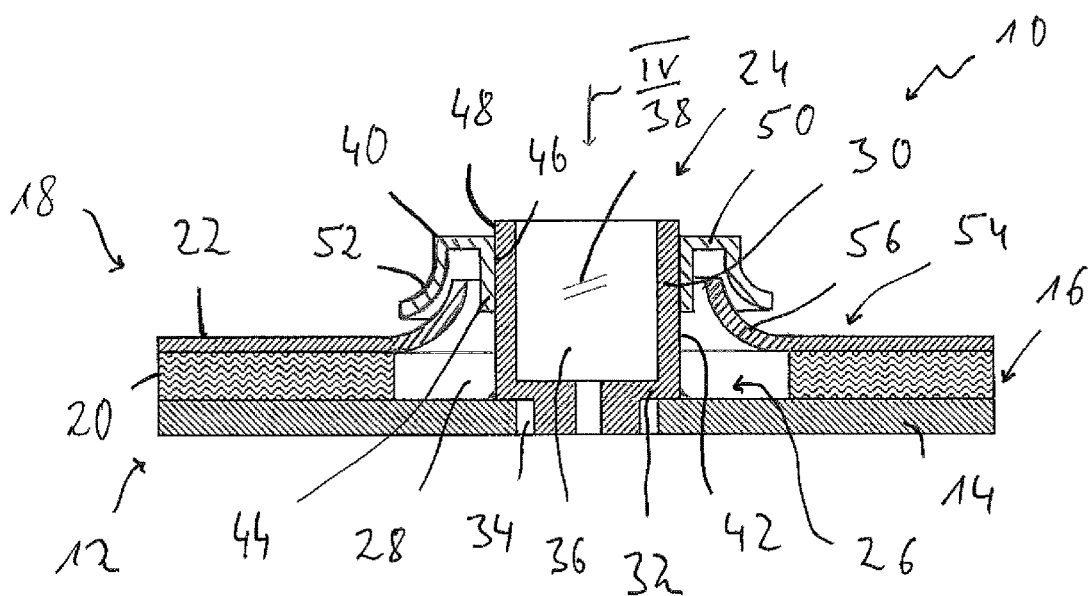
FIG. 3 is a partial sectional view corresponding to FIG. 1 with an alternative type of embodiment of the connection piece assembly unit.
Figure 4:
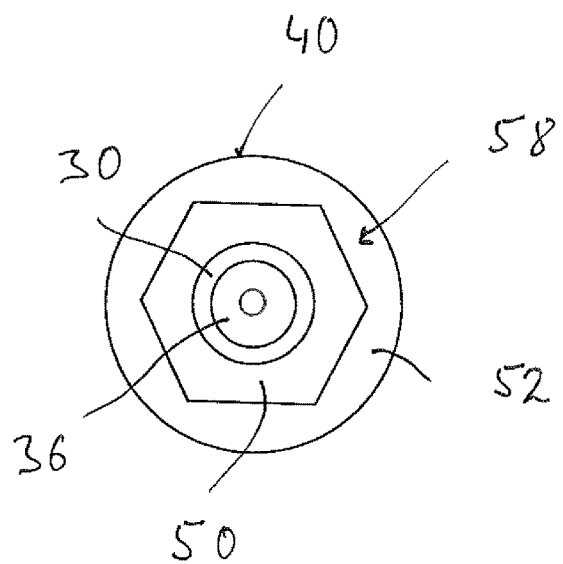
FIG. 4 is a top view of the connection piece assembly unit of FIG. 3 in the direction of view IV in FIG. 3.

FIGS. 3 and 4 show an alternative embodiment. This embodiment corresponds most closely to the embodiment described with reference to FIG. 1. However, it is seen that in case of the covering element 40, the shielding area 52 does not have an essentially cylindrical configuration as in the embodiment of FIG. 1, but rather expands in a bell-shaped manner in the direction towards the base area 32 of the connection piece 30. The shielding area 52 thus has a contour adapted to the shape of the edge section 56, so that an even greater overlap between these two areas can be achieved with still improved shielding action. In this embodiment as well, the covering element 40 can be fixed to the connection piece 30, for example, by thread meshing. For this purpose, the covering element 40 has the shape of a tool meshing formation 58, for example, again an external polygon in the area of the shielding area 52 adjacent to the overlapping area 50. The shielding area 52 then expands adjacent to this area in the direction towards the base area 32.

Figure 5:
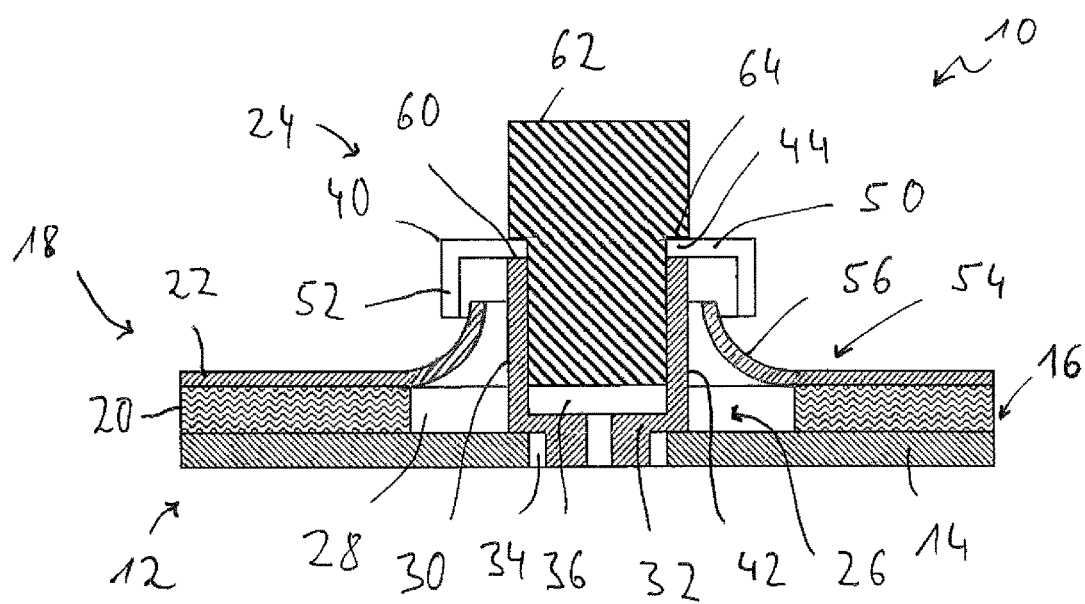
FIG. 5 is another partial sectional view corresponding to FIG. 1 with an alternative type of embodiment of the connection piece assembly unit.

Another alternative embodiment is shown in FIG. 5. In this embodiment, the covering element is shaped such that the fastening area 44 has a ring washer-like/ring washer-shaped/ring washer configuration, for example, it extends the overlapping area 50, which likewise has a ring washer-like/ring washer-shaped/ring washer configuration, in the direction towards the connection piece 30. The fastening area 44 is dimensioned and positioned such that it overlaps and is in contact with an end face 60 of the connection piece 30 facing away from the base area 32.

A measuring probe 62, which is inserted into the connection piece opening 36 and is held in it, for example, by means of thread meshing, overlaps the fastening area 44 and also the end face 60 of the connection piece 30 with a shoulder 64, so that the fastening area 44 is held or clamped between the end face 30 and the shoulder 64 of the measuring probe 62 permanently. In this way, on the one hand, the covering element 40 can be held rigidly with regard to the connection piece 30. On the other hand, the covering element 40 with its fastening area 44 can at the same time also fulfill the function of a sealing washer to be provided between the connection piece 30 and the measuring probe 62 anyway.

With its overlapping area 50 and its shielding area 52, the covering element 40 again forms, together with the edge section 56 of the layer of protective material 22, the labyrinth seal-like/seal-shaped/seal configuration explained above with reference to FIG. 1, so that the mounting area 26 is reliably covered against the penetration of material from the outside, on the one hand, and is at the same time also shielded against heat loss to the outside, on the other hand.

It should be pointed out that the shielding area 52 in the embodiment of FIG. 5 could, of course, also have the geometry shown in FIG. 3. It should also be pointed out that in case of an exhaust gas treatment device 10, a plurality of such connection piece devices 24 may be provided, for example, when various parameters are to be detected by various measuring probes. In this case, the various connection piece devices 24 may have an identical configuration, but may have a different configuration as well. Further, in an alternative embodiment, the layer of protective material could be guided away from the layer of covering material at a greater distance from the connection piece, so that the layer of covering material can extend even closer to the connection piece. In order to guarantee the above-described overlap, the overlapping area 50 may then, for example, have a greater length of extension, so that the overlap is nonetheless guaranteed with the edge section of the layer of protective material extending away from the device housing. Further, the shielding area 52 of the covering element 40 could extend starting from the fastening area 44 obliquely in the direction towards the base area 32 and away from the outside 42 of the connection piece 30, so that the covering element 40 has a configuration that has an approximately V-like/V-shaped cross section, with which the edge section 56 can mesh. The overlapping area extending essentially at right angles away from the outside 42 is dispensed with or this overlapping area is provided by the shielding area 52 in this embodiment.

While specific embodiments of the invention have been shown and described in detail to illustrate the application of the principles of the invention, it will be understood that the invention may be embodied otherwise without departing from such principles.

What is claimed is:

1. An exhaust gas treatment device for an exhaust system of an internal combustion engine, the exhaust gas treatment device comprising:
   a device housing;
   a covering device overlapping, in at least some areas, the device housing on an outside of the device housing;
   at least one connection piece assembly unit comprising:
   a connection piece with a base area for fixing the connection piece to a carrier assembly unit of the exhaust gas treatment device; and
   a covering element protruding over an outside of the connection piece, wherein the connection piece of at least one connection piece assembly unit is fixed to the device housing in a mounting area of the device housing, which mounting area is not overlapped by the covering device and the covering element of the connection piece assembly unit overlaps the covering device, in at least some areas of an edge area adjacent to the mounting area;
   the covering device comprising,
   at least one layer of covering material overlapping the device housing on an outside of the device housing in at least some areas,
   at least one layer of protective material overlapping the at least one layer of covering material in at least some areas on a side facing away from the outside of the device housing,
   the at least one layer of protective material, in the edge area of the covering device, which edge area is adjacent to the mounting area, extends with an edge section beyond at least one layer of covering material towards the connection piece and in a direction away from the outside of the device housing.

2. An exhaust gas treatment device in accordance with claim 1, wherein the covering element has a fastening area for fixing the covering element to the connection piece.

3. An exhaust gas treatment device in accordance with claim 2, wherein the covering element further comprises:
   an overlapping area extending, starting from the fastening area, in a direction away from the connection piece; or
   a shielding area extending in a direction towards the base area; or
   an overlapping area extending, starting from the fastening area, in a direction away from the connection piece and a shielding area extending in a direction towards the base area.

4. An exhaust gas treatment device in accordance with claim 3, wherein:
   wherein the covering element further comprises:
   an overlapping area extending, starting from the fastening area, in a direction away from the connection piece; and
   a shielding area extending in a direction towards the base area, wherein the shielding area extends, starting from the overlapping area, a distance from the fastening area.

5. An exhaust gas treatment device in accordance with claim 2, wherein the fastening area comprises a sleeve-shaped configuration and overlaps the connection piece on an outside of the connection piece.

6. An exhaust gas treatment device in accordance with claim 5, wherein:
   the fastening area is configured with an internal thread formation;

the connection piece is configured with an external thread formation provided on an outside of the connection piece; and the internal thread formation of the fastening area fasteningly meshes with the external thread formation on the outside of the connection piece.

7. An exhaust gas treatment device in accordance with claim 2, wherein the fastening area has a ring washer-shaped configuration.

8. An exhaust gas treatment device in accordance with claim 1, wherein the covering element is fixed to the connection piece by a connection in substance comprising welding, soldering or bonding.

9. An exhaust gas treatment device in accordance with claim 1, wherein the connection piece has a connection piece opening configured with an internal thread formation for receiving an assembly unit to be carried at the connection piece, the assembly unit being at least one of a measuring probe and a tool meshing formation with an external polygon, provided at the covering element.

10. An exhaust gas treatment device in accordance with claim 1, wherein:
in at least one connection piece assembly unit, the covering element overlaps the edge section in the direction away from the connection piece.

11. An exhaust gas treatment device in accordance with claim 1, wherein in the at least one connection piece assembly unit, the covering element is not in contact with the covering device.

12. An exhaust gas treatment device in accordance with claim 1, wherein the at least one connection piece assembly unit has the fastening area of the covering element held between the connection piece and an assembly unit carried on the connection piece.

13. An exhaust gas treatment device in accordance with claim 1, wherein:
the at least one connection piece assembly unit has the connection piece fixed with a base area to the device housing by a connection in substance comprising welding or soldering.

14. An exhaust gas treatment device in accordance with claim 1, wherein the covering element has a fastening area for fixing the covering element to the connection piece.

15. An exhaust gas treatment device in accordance with claim 14, wherein the covering element further comprises:
an overlapping area extending, starting from the fastening area, in a direction away from the connection piece; or
a shielding area extending in a direction towards the base area; or
an overlapping area extending, starting from the fastening area, in a direction away from the connection piece and a shielding area extending in a direction towards the base area.

16. An exhaust gas treatment device in accordance with claim 15, wherein:
wherein the covering element further comprises:

an overlapping area extending, starting from the fastening area, in a direction away from the connection piece; and
a shielding area extending in a direction towards the base area, wherein the shielding area extends, starting from the overlapping area, a distance from the fastening area.

17. An exhaust gas treatment device in accordance with claim 15, wherein the fastening area comprises a sleeve-shaped configuration and overlaps the connection piece on an outside of the connection piece.

18. An exhaust gas treatment device in accordance with claim 17, wherein:
the fastening area is configured with an internal thread formation;
the connection piece is configured with an external thread formation provided on an outside of the connection piece; and
the internal thread formation of the fastening area fasteningly meshes with the external thread formation on the outside of the connection piece.

19. An exhaust gas treatment device in accordance with claim 1, wherein:
in at least one connection piece assembly unit, the covering element overlaps the edge section in the direction towards the outside of the device housing on a side facing away from the connection piece.

20. An exhaust gas treatment device in accordance with claim 1, wherein:
in at least one connection piece assembly unit, the covering element overlaps the edge section in the direction away from the connection piece and overlaps the edge section in the direction towards the outside of the device housing on a side facing away from the connection piece.

21. An exhaust gas treatment device in accordance with claim 1, wherein:
the at least one layer of covering material is composed of fiber material comprising ceramic fiber material.

22. An exhaust gas treatment device in accordance with claim 1, wherein:
the at least one layer of protective material is composed of sheet metal material.

23. An exhaust gas treatment device in accordance with claim 1, wherein:
the covering device has a hole-like opening in at least one mounting area, and the at least one connection piece assembly unit has the connection piece fixed with a base area to the device housing by a connection in substance comprising welding or soldering, and the at least one layer of covering material is composed of fiber material comprising ceramic fiber material, and the at least one layer of protective material is composed of sheet metal material.

* * * * *